US00RE34129E

United States Patent [19]

Wright

[11] E Patent Number: Re. 34,129

[45] Reissued Date of Patent: Nov. 17, 1992

[54] RAILWAY TRUCK SIDE BEARING

[75] Inventor: James F. Wright, Washington, Pa.

[73] Assignee: A. Stucki Company, Pittsburgh, Pa.

[21] Appl. No.: 758,404

[22] Filed: Aug. 30, 1991

Related U.S. Patent Documents

Reissue of:

[64] Patent No.: 4,859,089
Issued: Aug. 22, 1989
Appl. No.: 144,667
Filed: Jan. 12, 1988

U.S. Applications:

[63] Continuation of Ser. No. 534,539, Jun. 6, 1990, abandoned, which is a continuation of Ser. No. 851,350, Apr. 14, 1986, abandoned.

[51] Int. Cl.[5] ..... F16C 17/04

[52] U.S. Cl. ..... 384/423; 384/595; 384/599

[58] Field of Search ..... 384/597, 595, 599, 600, 384/601, 423

[56] References Cited

U.S. PATENT DOCUMENTS

| | | | |
|---|---|---|---|
| 2,301,372 | 10/1939 | Cottrell . | |
| 2,754,768 | 7/1956 | Hile | 105/197 |
| 3,518,948 | 7/1970 | King | 105/199 |
| 3,556,503 | 1/1971 | Van Moss | 267/3 |
| 3,628,464 | 12/1971 | Van Moss | 105/199 |
| 3,670,661 | 6/1972 | Pangalila | 105/199 |
| 3,796,167 | 3/1974 | Van Moss | 105/199 |
| 3,957,318 | 5/1976 | Wiebe . | |
| 4,080,016 | 3/1978 | Wiebe . | |
| 4,090,750 | 5/1978 | Wiebe . | |
| 4,567,833 | 2/1986 | Hanson | 105/199 |

*Primary Examiner*—Lenard A. Footland
*Attorney, Agent, or Firm*—Carothers and Carothers

[57] ABSTRACT

A side bearing for a railway car having a pair of spaced elongated resilient elastomeric elements which bias the elements of the side bearing in operative position and which elements preferably have uppermost separate members which are effective for generating increased frictional dissipation of energy over the frictional energy dissipation available with an elastomeric element only and for providing, in cooperation with the elastomeric elements, improved bearing performance through the deformation of the elastomeric elements under initial loading and under operating loads.

23 Claims, 5 Drawing Sheets

RAILWAY TRUCK SIDE BEARING

Matter enclosed in heavy brackets [ ] appears in the original patent but forms no part of this reissue specification; matter printed in italics indicates the additions made by reissue.

This is *a continuation of co-pending application Ser. No. 07/534,539 filed on Jun. 6, 1990, abandoned, and a reissue of Ser. No. 07/144,667, filed Jan. 12, 1988, now U.S. Pat. No.* 4,859,089, which is a continuation of co-pending application Ser. No. 851,350 filed Apr. 14, 1986, abandoned.

This application is related to copending application Ser. No. 944,654, filed Dec. 22, 1916, assigned to the assignee of this application.

BACKGROUND OF THE INVENTION

In a railway vehicle such as a freight car, a car body is supported on the centerplate of a pair of spaced trucks. The coned wheels of the trucks travel a sinuous path along tangent or straight track as they continually seek a centered position under the steering influence of the wheel conicity. In traveling such a sinuous path, a truck will yaw cyclically with respect to the car body about the vertical axis defined by the vertical center line of the truck bolster centerplate.

Of course, the truck also yaws or rotates quasi-statically with respect to the car body in negotiating curved track. As a result of the aforementioned cyclic yawing, "hunting" can occur as the yawing becomes unstable due to lateral resonance that can develop between the car body and the truck. The reader is referred to prior U.S. Pat. No. 3,957,318 for further explanation of railway vehicle hunting phenomena, as well as disclosure of a vehicle side bearing which utilizes resilient bearing elements to provide restraining friction and shear stiffness at magnitudes which have been found successful for control of hunting. Such side bearings are in widespread use in modern railway rolling stock. The entire disclosure of prior U.S. Pat. No. 3,957,318 is incorporated herein and made a part hereof by reference.

Other prior side bearings commonly have comprised spring or elastomer biased steel caps retained by a base or cage. Disclosures of railway car side bearings known to applicant include the following: U.S. Pat. Nos. 2,301,372; 2,754,768; 3,518,948; 3,556,503; 3,628,464; 3,670,661; 3,796,167; 4,090,750; 4,080,016; and 4,567,833. Included among these are disclosures of resilient side bearing elements.

While the elastomer side bearing disclosed in U.S. Pat. No. 3,957,318 has proven generally successful in controlling high speed, empty car hunting for many freight cars, higher speed performance of laterally sensitive, longer freight cars and intermodal freight cars with extremely light empty car bodies requires more rigid side bearing longitudinal restraint and higher magnitude of car body to side bearing interface friction for hunting control. For this purpose, the instant invention contemplates a side bearing in which an elastomer column carries a metallic, higher friction generating cap with the cap being biased by the elastomer column. The elastomer column and the cap are so interlocked as to stiffen the longitudinal shear restraint of the side bearing, but at the same time retain the nearly linear elastic shear characteristic for longitudinal side bearing-to-car body motion which precludes impacting between metal parts as occurs in the case of prior art metal cap side bearings that utilize the vertical wall engagement between the side bearing top friction member or cap and the base member as a longitudinal shear restraint limit.

The instant invention insures that the linear shear restraint is sufficiently stiff to inhibit the onset or initiation of wheelset yaw and lateral movement. If the linear shear restraint is too soft, changes in wheelset direction are permitted to increase thus giving higher and higher wheel rail creep forces to be overcome. The lateral amplitude of the sinuous wheelset path becomes greater at a given speed sufficient to force the car body mass into lateral resonance on the truck, and the trucks begin to hunt. This condition is prone to occur with prior art all-elastomer bearing blocks when they are required to perform under severe dynamic conditions of frequent compression and shear cycles which cause increased operating temperatures. The higher temperatures in turn result in slope of the linear shear restraint and hunting is prone to occur at a lower threshold speed. Prior art side bearings with spring or elastomer biased rigid caps interacting with a rigid base usually have a soft or weak constraint between rigid limits, which permits the onset or initiation of wheelset yaw and lateral displacement with little restraint. The wheelset yaw momentum must then be suddenly impeded by the cap impacting longitudinally against the base. If these limits permit increased motion due to wear and impact, the side bearing permits truck hunting at lower and lower speeds thus creating a rapidly deteriorating condition and eventually causing the loosening of the bearing on the bolster and the wear plate on the car body. As the longitudinal free motion space between the cap and the base increases, the side bearing may become completely ineffective for hunting control.

Manufacturing tolerances for such prior art bearings require some lateral and longitudinal clearance between the cap and the base so that the vertical compression between vertical limits is unimpeded. As a result, all such prior side bearing designs are prone to acquire increased cap-to-base longitudinal clearance through wear of any combination of longitudinal impacting and vertical compression or extension.

With metal cap side bearings, lower bearing preloads are necessary so that the maximum swivel resistance to side bearing restraint for all dynamic side bearing load conditions is less than the rail-to-wheel sliding friction moment under the empty car.

Prior side bearings employing elastomeric means for biasing metal caps have been limited to short elastomeric biasing columns. Such short columns cause higher preload as well as greater side bearing friction level changes due to set up space variations which occur with dynamic car motions. Since the metal cap-to-car body wear plate coefficient of friction can exceed the rail-to-wheel coefficient, sufficient truck swivel restraining friction can be generated by the metal cap side bearing under the empty car body weight to require sliding or near sliding rail wheel conditions to turn the truck, causing accelerated wheel tread and wheel flange wear. Unduly high side bearing friction can also cause the wheel flanges to climb the rail and derail the truck.

Prior side bearings using helical spring loaded caps assembled on a metal base have inherently required a short spring with a high spring constant due to the vertical space limitation for assembly between the car body bolster structure and the truck bolster. Here again, extreme friction variations will occur from small side bearing vertical height changes.

BRIEF SUMMARY OF THE INVENTION

The instant invention retains the shear flexibility of the prior art all-elastomer bearings in both shear and compression stiffness and at the same time applies a metal interlocking cap which provides the additional necessary friction for higher speed hunting control. At the same time the instant invention includes embodiments that insure longitudinal fitup with no free space and with little or no anticipated wear due to elastomer-metal vertical interfaces as well as continual longitudinal wear compensation where wear between metal-to-metal interfaces is prone to occur, thus insuring longer service life with higher speed truck hunting control.

More specifically, this invention comprises a resilient side bearing with metal friction interfaces biased by deformed columns of elastomer to provide higher magnitude car body-to-truck frictional restraint which resists truck swivel or yaw, as well as greater but more optimum elastic shear restraint to truck swivel prior to side bearing friction breakaway. The result is greater lateral stability for higher freight car speeds, i.e. higher threshold hunting speeds for freight cars with coned wheel trucks and improved service life of the side bearing as well as the side bearing attachments or fasteners. In this invention metal friction caps, with proper longitudinal biasing geometry, interlock with elastomer columns that abut the end structure of the side bearing base or cage.

The higher frictional resistance is achieved by biased engagement of contacting metal surfaces under the influence of optimum and generally lower preload provided by the deflected elastomer columns. The cap-to-elastomer interlock increases the longitudinal side bearing shear stiffness which is needed to limit truck to car body rotation prior to side bearing sliding at friction breakaway force levels. Increased side bearing shear stiffness thus is obtained in a linear fashion without the abrupt impact that can occur with longitudinal friction breakaway in prior side bearings. The metal caps also ensure constant sliding friction performance and conduct most of the friction-generated heat away from the sliding interface thereby maintaining greater uniformity of elastomer temperature, and more consistent elastomer shear and compression stiffness.

In a presently preferred embodiment a maximum elastomer column height is utilized to achieve more uniform metal friction cap biasing and a resultant narrower range of truck restraining friction for the required range of set-up space and operating variations. Also contemplated is an inclined or sloping elastomer to metal cap interface geometry and an embodiment with the longitudinal elastomer abutment engaging vertical interlocking surfaces for lateral side bearing rigidity to provide a component of lateral car body-to-bolster restraint which is additive in its effect to the longitudinal side bearing restraint for even higher speed lateral stability. The end abutment engagement between the elastomer columns add the bearing cage restrains lateral movement of the preloaded elastomer columns. This permits the elastomer columns to respond to relative lateral motion between the car body and the truck with elastomeric shear restraint of suitable magnitude to provide the desired lateral control, and without imposing harsh impact loads on the lateral sidewalls of the bearing carrier.

It is therefore one object of the invention to provide in a side bearing assembly an elastomeric column received in the bearing carrier that is affixed to the truck bolster, and a relatively rigid friction interface portion which is interlocked with the elastomeric column and frictionally engages the side bearing wear plate affixed to the car body under elastomer preload to provide optimized control of truck hunting responses by retaining the shear flexibility of prior all-elastomer bearings in both shear and compression stiffness and providing the additional necessary friction for higher speed hunting control.

Another object of the invention is to provide a side bearing which combines rigid frictional sliding and elastomeric deformation to offer such optimal control of hunting responses occurring as a result of relative yaw between a freight car body and its trucks.

A further object of the invention is to provide an elastomeric side bearing having improved and stiffer longitudinal restraint while retaining a nearly linear elastic shear characteristic to avoid longitudinal impact, at column friction break force levels, of bearing elements against the ends of the bearing carrier.

Still another object of the invention is to provide an elastomeric side bearing having longitudinal fitup in a bearing carrier with no longitudinal free space and continual longitudinal wear compensation.

Still another object of the invention is to provide a side bearing having rigid and resilienty deformable members interlocked by a novel geometry for an integral assembly that provides an improved bearing response characteristic with regard to the force-deflection characteristic of the bearing in longitudinal and lateral shear.

These and other objects and further advantages of the invention are more fully described in the following detailed description with reference to the accompanying drawings, in which.

Figure 1:
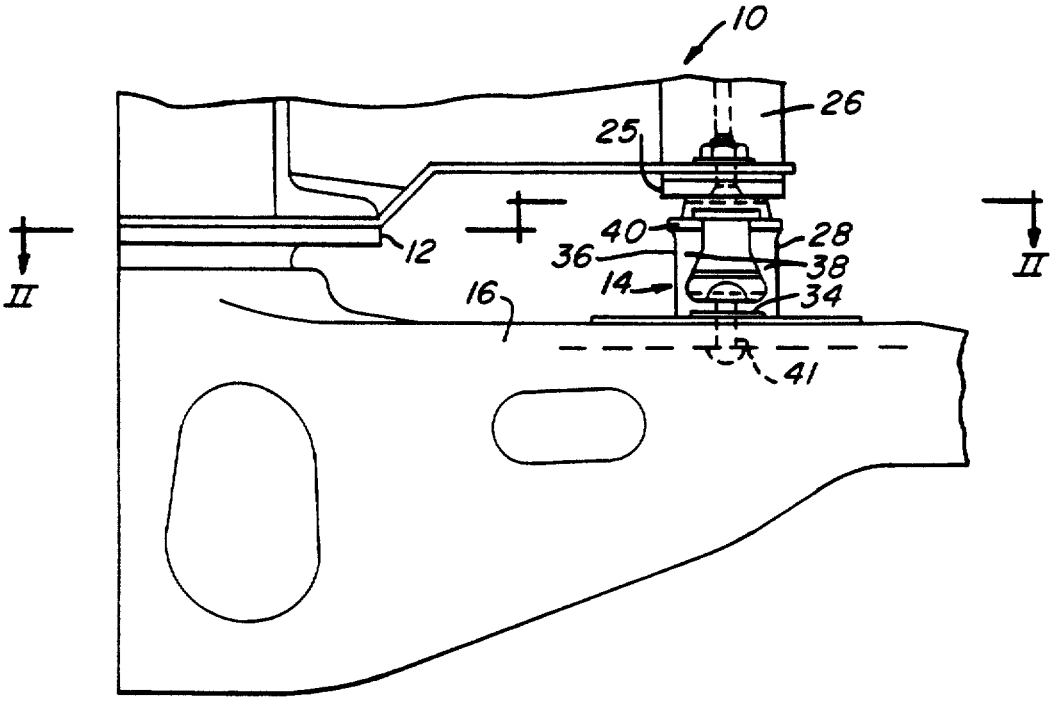
FIG. 1 is a fragmentary, generally schematic side elevation of portions of a railway vehicle truck and a car body mounted thereon with a side bearing of the present invention mounted therebetween.
Figure 2:
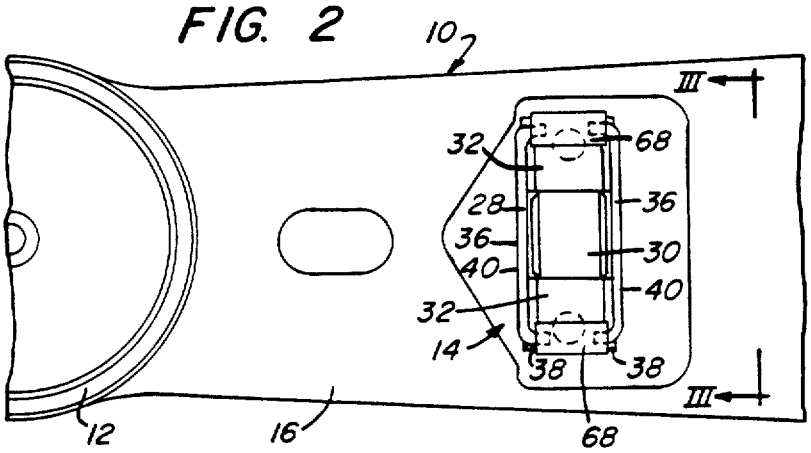
FIG. 2 is a fragmentary top plan view taken on line II—II of FIG. 1.
Figure 3:
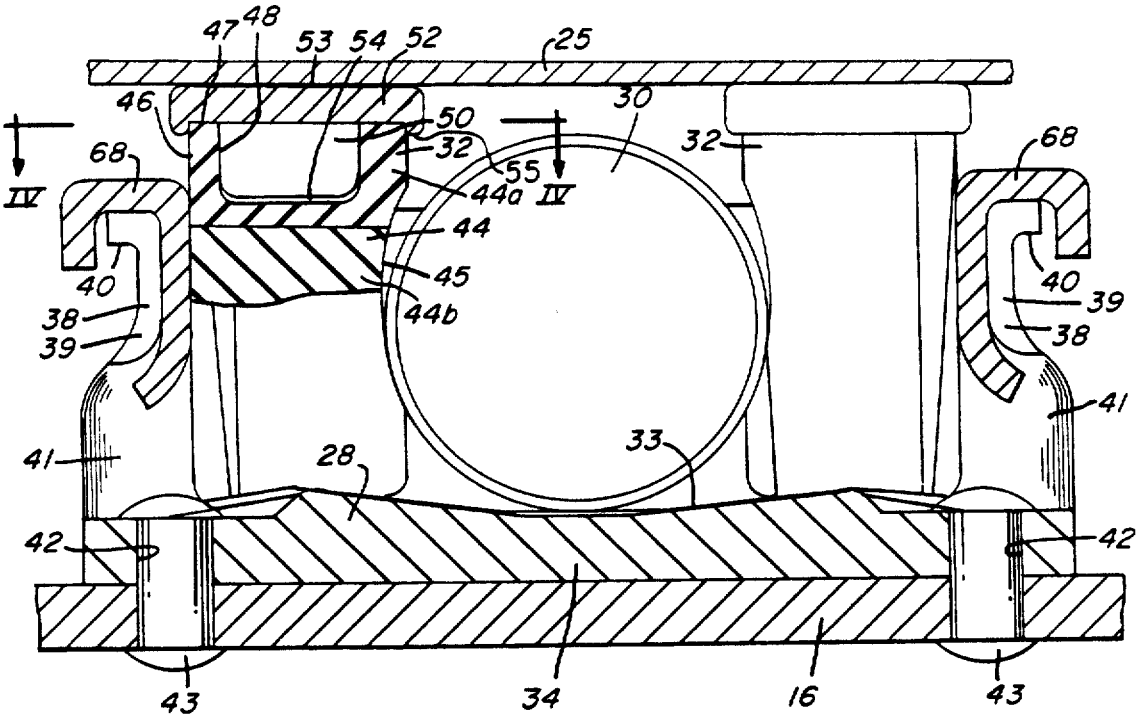
FIG. 3 is a side elevation, partially in section, taken from line III—III of FIG. 2.

In FIGS. 1, 2 and 3 there in generally illustrated at 10 a fragmentary portion of a 4-wheel railway freight car body and truck assembly comprising a center plate 12 and side bearing assemblies 14 of the present invention which cooperate with a bolster 16 to support the car body 26. Well known spring groups (not shown) are located in a pair of side frames (not shown) to support the bolster 16. Suitably journaled wheels (not shown) which rest on rails (not shown) support each side frame in a well known manner. Wear plates 25 are carried by car body 26 for engagement with each side bearing 14. Inasmuch as the invention herein is the primarily directed to side bearing assemblies 14 and the balance of the elements set forth hereinabove are well known in the art, further detailed description of such elements is believed unnecessary for an understanding of the present invention.

Side bearing assembly 14 comprises: an elongated bearing channel 28; a cylindrical steel roller bearing 30 disposed within channel 28; and a pair of spaced bearing block assemblies 32, each of which is disposed in channel 28 intermediate roller 30 and the respective axial end of channel 28. Bearing channel 28 includes a longitudinally extending base 34 and a pair of transversely spaced side walls 36 projecting upwardly from and extending along the sides of portion 34. The respective longitudinal end portions 38 of side walls 36 turn inwardly toward the longitudinal center line of channel 28. As shown, each end portion 38 includes an upper, generally vertical section 39 and a lower section 41 which extends downwardly and tapers outwardly from vertical section 39. A peripheral flange 40 projects outwardly from each sidewall 36 adjacent the uppermost end thereof. In assembly, the longitudinal extent of channel 28 is disposed transversely of the longitudinal extent of bolster 16 so as to extend longitudinally of the car body or in the direction in which the rails extend. Channel 28 is affixed to bolster 16 in any suitable manner, for example, by suitable rivets 43 or the like which extend through longitudinally spaced boxes 42 in base portion 34.

Roller 30 has an axial dimension slightly less than the width of the opening defined between sidewalls 36, and a diameter which is greater than the height of side walls 36 above base 34. In the assembled configuration, the axis of roller 30 extends transversely of the longitudinal extent of channel 28.

Figure 5:
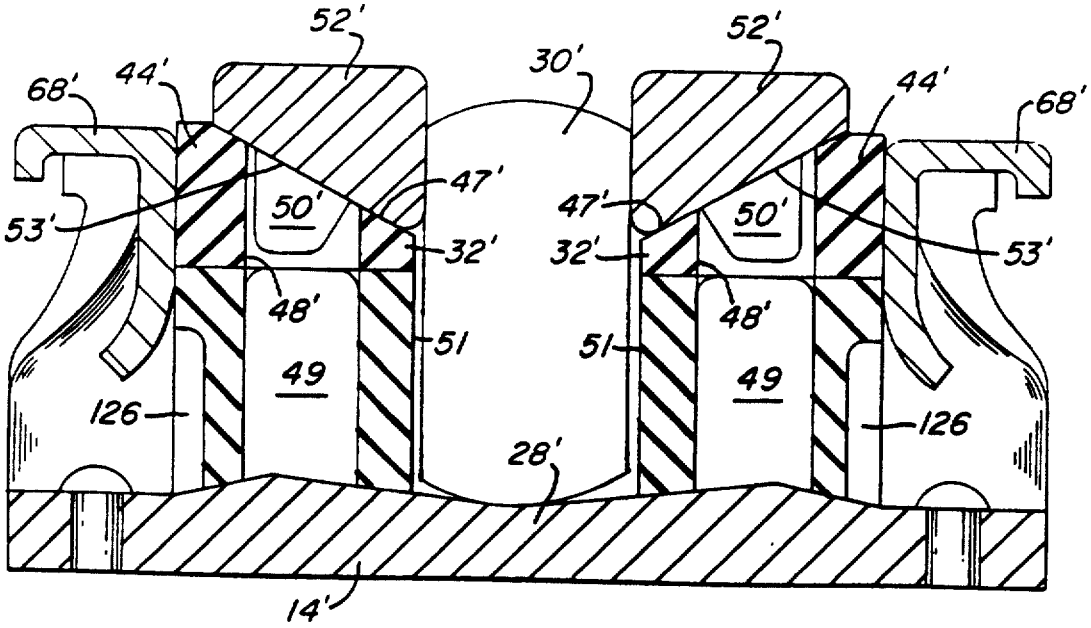
FIG. 5 is a sectioned side elevation of an alternative embodiment of the invention.

Each bearing block assembly 32 comprises a formed, resiliently deformable elastomeric member 44 having a configuration suitable to accommodate insertion of one of assemblies 32 into channel 28 on either side of roller 30 intermediate the roller 30 and the respective adjacent ends of channel 28. The particular form of each assembly 32 is subject to modification within a latitude of design criteria; however, in general they may be similar to the corresponding elastomeric bearing members described in U.S. Pat. No. 3,957,318, the entire disclosure of which has been incorporated herein and made a part hereof by reference. More particularly, each bearing member 44 may include a relatively "hard" upper portion 44a and a relatively "soft" lower portion 44b as shown in FIGS. 3 and 5 and as more fully described in the referenced U.S. Pat. No. 3,957,318. Furthermore, this combination of relatively hard and soft elastomers in a single bearing element may be applied to any contemplated embodiment of the invention described herein, although bearing elements of a single, uniform elastomeric material may also be suitable in some embodiments.

The upper end of each elastomeric bearing member 44 includes an upstanding end portion 46. A formed recess 48 is defined within the confines of the generally rectangular cross-section of end portion 46 and extends downwardly from the uppermost end 47 thereof.

Figure 4:
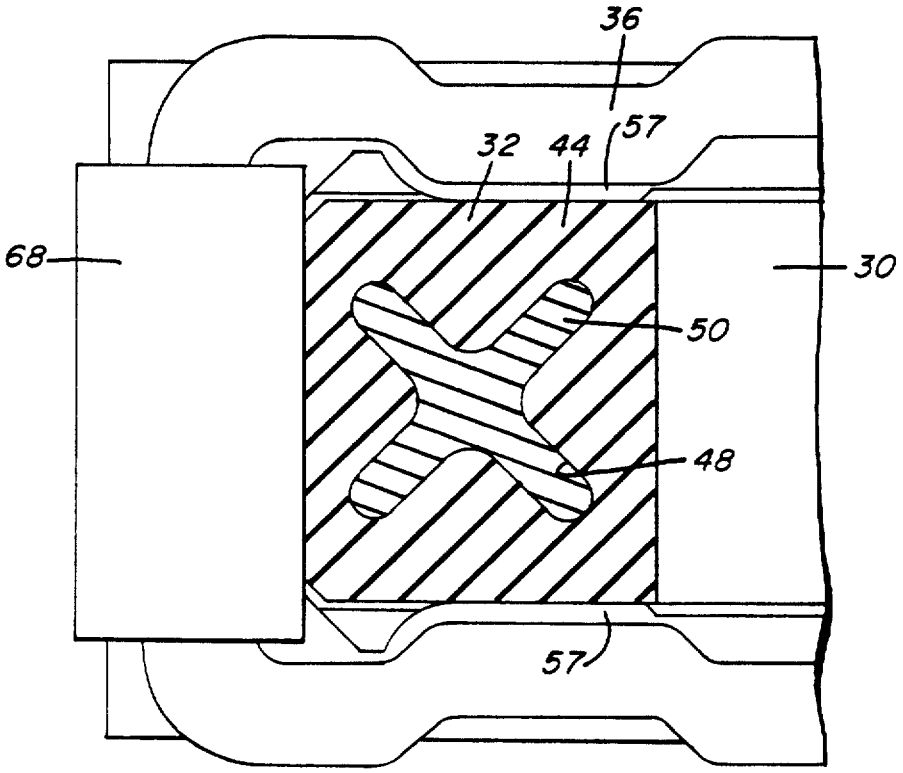
FIG. 4 is a fragmentary, partially sectioned top plan view taken on line IV—IV of FIG. 3.

As shown in FIG. 4, for this embodiment recess 48 preferably takes generally the form of an X to receive the cooperably formed interlocking projections 50 of a rigid metallic cap member 52 which is received atop elastomeric member 44 and is of a cross-sectional configuration generally conforming to that of upper end portion 46 of the member 44. With cap 52 installed on member 44 as described and in engagement with the top surface 47 thereof, projections 50 project downwardly into recess 48 less than the full depth thereof to leave a space or gap 54 which serves to permit preload compression of the upper end 46 of member 44 without unnecessarily increasing the vertical rigidity of the member 44. Legs 50 are dimensioned for an interference fit within recess 48 to provide a firm interlock therewith to positively retain cap 52 in the described installed condition atop member 44 and in engagement with surface 47.

Cap 52 preferably includes a depending skirt portion 55 which closely encompasses the exterior periphery of the upper end 46 of member 44 so as to contain or confine same and thereby prevent the imposition of excess longitudinal tension loads on upper portions of the member 44 when it is deformed vertically and in longitudinal shear.

To assemble a side bearing assembly 14, a pair of the bearing assemblies 32 are disposed within channel 28 adjacent the respective ends thereof and end closures 68 are inserted intermediate the respective outer surfaces of bearing assemblies 32 and the inturned end portions 38 of side walls 36. Closures 68 thus retain the assemblies 32 and prevent the elastomer of the members 44 from extruding between end portions 38 of sidewalls 36. Roller 30 is then inserted between the bearing assemblies, the tops of assemblies 32 being tipped away from each other to the extent possible to receive the roller 30.

The bearing channel 28 illustrated and described herein is generally of a configuration similar to those used on the vast majority of railway freight car side bearings in use today. Because it is one object of the present invention to provide means to retrofit existing side bearings to obtain the advantages of the present invention, it is to be understood that modifications to the embodiments of the bearing members described above can be readily made for alternative bearing channel configurations to achieve totally new configurations of side bearing assemblies. Furthermore, it is anticipated that upon knowledge of the present invention, various modifications can be made to the embodiments described either in retrofit or in new side bearing configurations without departing from the scope of the invention.

FIG. 3 shows the side bearing 14 in the unloaded state. Preferably, each side bearing is preloaded in compression by the car body weight. Metallic cap-to-wear plate frictional engagement is maintained throughout a range of normal or vertical loads to provide frictional response suitable for control of hunting or other dynamic responses. The desired range of normal loads preferably corresponds to a range of commonly experienced relative roll positions that the car body normally assumes with respect to the truck bolster in travel. Thus, upon assembly of a car body 26 on trucks equipped with side bearings 14, the wear plates 25 will frictionally engage the uppermost surfaces 53 of the respective metallic caps 52 and, under the weight of the car body 26, each member 44 will be deformed in vertical compression until the car body rests on center plate 12. The vertical compression results in sufficient transverse expansion to insure longitudinal confinement between the bearing components and the carrier in which they reside. This permits the invention to accommodate variation in the length of various bearing carriers resulting from manufacturing tolerances and component wear in service. When the car body 26 is supported at rest on center plate 12, elastomeric members 44 are preloaded in vertical compression to a predeterminable extent less than the compression required to bring the wear plates 25 into engagement with roller 30. A further predeterminable increment of vertical compression of member 44 is therefore available to accommodate and control car body roll. The limit of further elastomer compression which can be accommodated is defined by engagement of each wear plate as with the respective roller 30 when rollers 30 are supported on an upper surface 33 of base 34. At this point, vertical compression of members 44 will be at a maximum value.

As members 44 are compressed vertically under load from the unloaded state shown in FIG. 3, the inwardly facing arcuate surface portions 45 thereof, which are in confronting relationship with roller 30, progressively conform to the cylindrical periphery of roller 30 and the roller 30 is confined therebetween. This state occurs at normal static load levels for either an empty or a loaded car. Thus it will be seen that the degree of longitudinal confinement of the elastomeric members 44 in dependent on the magnitude of vertical loading thereon; however, at all times the degree of confinement of members 44 must be at least sufficient to eliminate all longitudinal free space from the bearing assembly.

At preload vertical compression of members 44, or maximum vertical compression, or at any degree of compression between these limits, the members 44 will be subjected to horizontal shear deformation in response to relative movements, including relative yawing, of car body 26 with respect to bolster 16. The side bearing 14 accommodates such relative movements with initial horizontal shear deformation. Thus, in response to such horizontal movements, the upper portion 46 of each member 44 deforms in shear to accommodate the movement until the frictionally engaged surfaces of cap 52 and wear plate 25 break static friction and slide frictionally upon one another. The shear deformation of the upper end of member 44 thus accommodates an initial increment of relative motion, and the frictional sliding of cap 52 on wear plate 25 accommodates further movements. Furthermore, in shearing-type movement the elastomer trapped between the projections 50 of cap 52 and the adjacent end closure 68 is compressed, thus further stiffening the bearing shear restraint.

The available shear stiffness of prior art all-elastomer bearing blocks is seriously reduced when they are exposed to prolonged periods of severe service, that is high speeds on uneven track, due to the internal heating and softening of the elastomeric material. In fact, under severe operating conditions prior art all-elastomer bearing blocks could generate sufficient heat from internal hysteresis and soften sufficiently to become ineffective or even to deteriorate physically. The projections 50 offer a heat conducting path from the highest temperature locations inside the elastomeric block to be radiated from the cap surfaces 52 over wear plate 25. The projections 50 are embedded with a specified interference fit into the harder top material 44a of the bearing block. As the bearing block temperatures increase and the material softens from internal hystersis and frictional movement between cap 52 and wear plate 25, the rigid projection 50, when properly interlocked with the top material 44a, maintains the necessarily high linear shear longitudinal resistance of the bearing for higher speed hunting control.

Thus it will be seen that the static frictional engagement between the cap 52 and wear plate 25 for each bearing assembly 32 may be maintained throughout the normal operation of a freight car on straight or very slightly curved track. The invention thereby effectively controls hunting within acceptable limits primarily by such frictional engagement. In other words, bearing assemblies 32 control hunting by providing a longitudinal shear constraint at the side bearings within a predetermined acceptable range of shear forces to assure that the linear shear restraint is sufficiently stiff to inhibit the onset or initiation of any change in wheel set yaw orientation or lateral position between the rails. The maximum shear force that the bearing interface will tolerate without sliding is limited by the friction developed between cap 52 and wear plate 25, and the shear force limit is therefore variable with variation of the vertical compression of members 44. In any event, the shear force developed is sufficient to inhibit hunting throughout the range of elastomer compression caused by car body roll, but must also be sufficiently limited to allow friction break and relative sliding between the wear plate 25 and caps 52 for proper wheel set steering or tracking.

In order to provide suitable hardness and modulus of elasticity characteristics in members 44 for the requisite stiffness in shear to prevent hunting but still maintain an ability of the members 44 to compress vertically for dynamic and preload conditions, the members 44 in the preferred embodiment discussed hereinabove may have a modulus of elasticity (unit stress per unit strain) in the range of 7,000 to 20,000 psi, and a hardness preferably in the range of 54 to 62 Shore D. Of course, the modulus of elasticity and hardness of the respective portions 44a and 44b of any given bearing member 44 are selected to provide performance consistent with the specified ranges for these parameters. A more extensive discussion of the desired mechanical properties for the elastomeric members utilized in conjunction with this invention will be found in the above referenced U.S. Pat. No. 3,957,318. Most elastomeric materials, including urethanes, relax or exhibit initial creep under load. Accordingly, the properties discussed above are those observed after initial loading and a relaxation period at room temperature.

FIG. 5 illustrates an alternative embodiment of the invention wherein a side bearing 14' comprises a channel member 28' similar in all salient respects to the above-described channel member 28. Channel member 28' receives centrally thereof a rigid bearing element which may be a roller or alternatively, for this or any other described embodiment of the invention, a rocker element 30' as shown. Intermediate rocker 30' and each longitudinal end of channel member 28' there is disposed a bearing block assembly 32' which is comprised of an elastomeric bearing block 44' and a rigid metallic cap 52' carried thereby. Bearing block 44' includes a recess in the form of a longitudinal slot 48' which extends downwardly from an upper surface 47' thereof within the confines of the cross-section of bearing block 44'. A cooperating interfitting projection or fin 50' of cap 52' projects downwardly into slot 48' to secure the cap 52' atop member 44'.

In this embodiment, fin 50' is provided with clearance not only from the bottom of slot 48' but also from the longitudinal ends thereof whereby the cap 52' is longitudinally movable with respect to member 44'. An interference fit is provided between the lateral side walls of slot 48' and the respective adjacent portions of fin 50' to secure cap 52' atop member 44'. Also in this embodiment, surface 47' is inclined to the horizontal, extending upwardly and outwardly from a location adjacent rocker 30' toward the respective ends of channel 28'. Cap 52' is cooperably formed to present an engagement surface 53' for engagement with a ware plate (not shown) when installed atop member 44' in contact with surface 47'.

It is noted that each bearing block 44' includes a lower open cavity portion 49 which provides open interior space within the bearing block 44' to accommodate lateral expansion of the elastomer which results as one mode of deformation occurring during vertical compression of the bearing block 44' under load. The cavity 49 thus affords an elastomeric bearing block which is not as stiff as a solid elastomeric bearing block of the same material would be. As further accommodation for horizontal expansion of bearing block 44' under vertical load, clearance is provided as at 51 to accommodate longitudinal expansion of the bearing block 44. Entirely similar lateral or side gaps as shown in FIG. 4 at 57 are provided to accommodate lateral outward expansion or deformation of the bearing block 44' under load.

This embodiment of the invention operates substantially as the above described embodiment. Additionally, however, the preload of a car body on the side bearing not only compresses the elastomeric block 44' vertically, it also provides a wedging action as the caps 52' are wedged inwardly toward rocker 30', and elastomeric blocks 44' are correspondingly wedged outwardly toward the respective end closures 68'. Thus, the bearing assemblies 32' take up all free space or slack between the ends of channel 28'. Further, this embodiment of the invention offers improved uniformity of shear response of the elastomer and provides a self-centering action which tends to center the rocker 30'. This effect occurs as an off-center rocker condition will result in a larger space to receive deformation of the elastomeric member 44' on one side of the rocker 30', and a correspondingly smaller space therefor on the opposite side of the rocker element 30'. Accordingly, upon equal compression of the elastomeric members 44' on either side of the intervening rocker bearing element, a center directed force component differential will be imposed on the rocker element 30' therefore tending to return the rocker to its centered position. In addition, rocker position 30' is held by friction along the vertical interfaces with the two cap wedges 52'. As the bearing is compressed vertically the longitudinal forces squeezing the rocker increase and as the bearing blocks extend the rocker is held in place and rises upwardly with the confining wedge caps. The rocker then remains in captive confinement, moving up and down with the metal wedge caps. This mechanism then largely reduces wear between the only two pairs of vertical metal interfaces critical to longitudinal confinement. Additional features of the described wedging action include elimination of all longitudinal free play as above described, such that control can be achieved with the minimum force. This is of considerable benefit on light cars where the vertical force magnitude is small.

Figure 6:
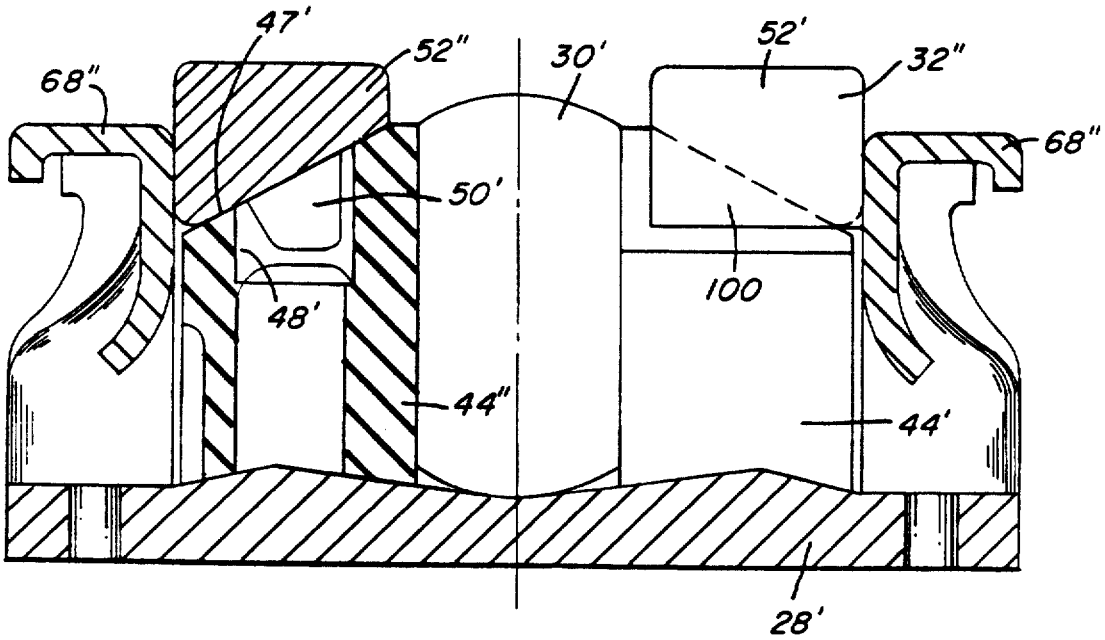
FIG. 6 is a partially sectioned side elevation similar to FIG. 5 showing another alternative embodiment of the invention.

FIG. 6 illustrates another alternative embodiment of the invention which is similar in many salient respects to the FIG. 5 embodiment but in which the metallic caps 52" are wedged outwardly toward the respective ends of channel member 28' and the elastomeric members 44" are wedged inwardly toward rocker 30'.

The FIG. 6 embodiment is more rigid in shear than the FIG. 5 embodiment because, with cap members 52" wedged against the respective end closures 68', longitudinal shear stiffness of the bearing is increased since, for relative car body-to-bolster movement in either longitudinal direction, the one of the rigid bearing caps tending to move toward the adjacent end closure will already be in solid rigid engagement therewith. As a result, the FIG. 6 embodiment offers an even more rigid shear condition with rigid friction breakaway occurring at one metal cap only at the onset of motion in either direction. The performance result for this case will be a longitudinal rigid shear effect for only half the friction force. After the friction break of the cap 52" abutting the rigid end plate 68", the remaining cap will stick and permit elastic shear deformation until its breakaway friction is overcome. This embodiment approaches an infinitely rigid case in longitudinal shear response but only for one-half the friction force and responds linearly for the other half of the friction force between the wear plate and the cap 52".

The FIG. 6 embodiment illustrates on the left hand side thereof the retention of cap 52" by means of a fin 50' in accordance with the description of the FIG. 5 embodiment. The right hand side of the FIG. 6 embodiment illustrates an alternative mode of rigid cap retention in that cheecks 100 may be provided on opposite lateral sides of cap 52' to overlap respective portions of the member 44', in lieu of the above-described fin 50' engaged within recess 48'.

Figure 7:
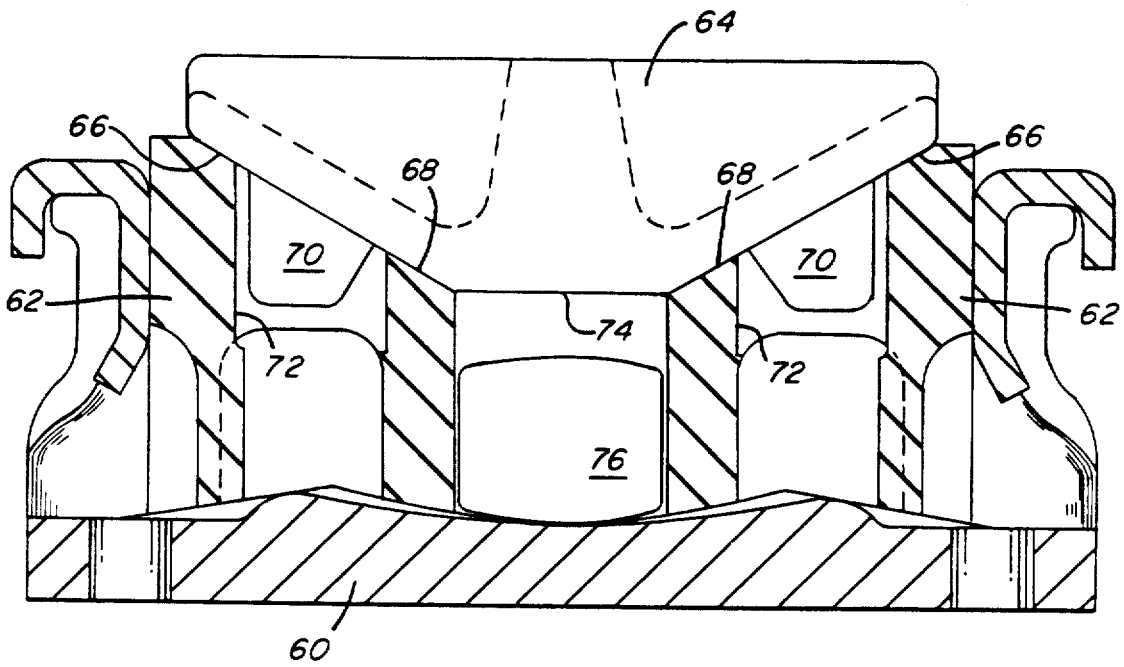
FIG. 7 shows a further alternative embodiment of the invention.
Figure 8:
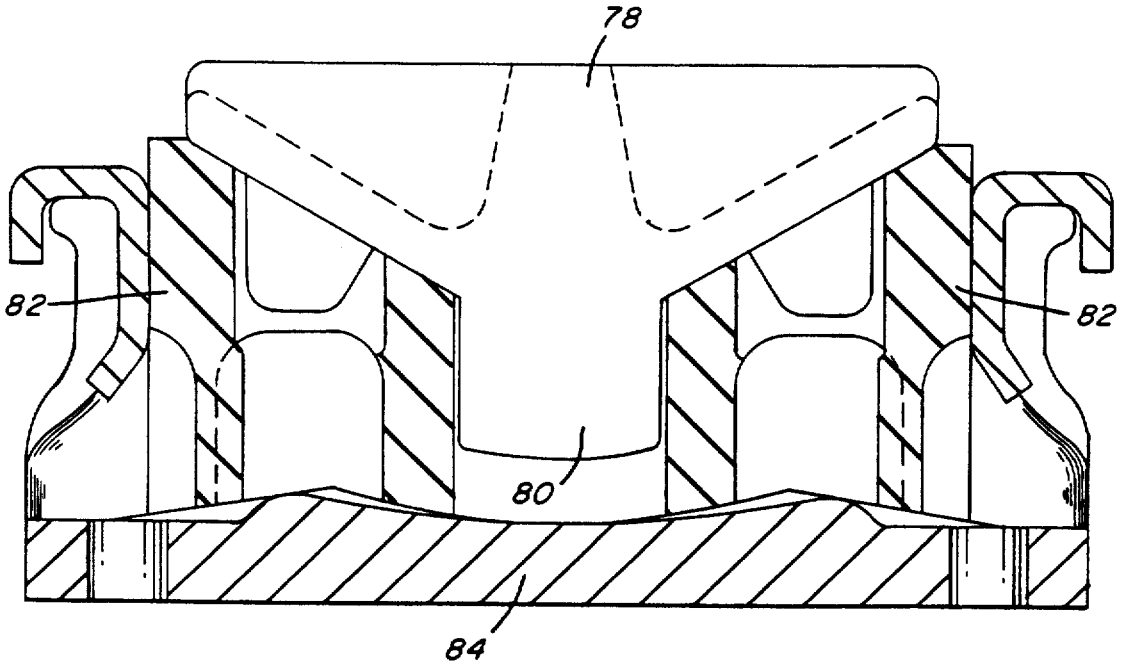
FIG. 8 shows yet another alternative embodiment of the invention.

FIGS. 7 and 8 show alternative embodiments which are similar in many salient respects to the FIG. 6 embodiment. It is contemplated that the FIG. 7 and 8 embodiments could be modified to be similar to the FIG. 5 embodiment rather than to the FIG. 6 embodiment by reversing the slope of the inclined interfaces between the respective elastomeric and rigid members.

More specifically, in FIG. 7 a carrier 60 confines an assembly of bearing elements, including a pair of resilient elastomeric members 62 similar to the elements 44" of FIG. 6, and a unitary rigid metallic cap element 64 having a pair of inclined undersurfaces 66 which engage complementary upper inclined surfaces 68 of members 62. A fin 70 projects from each surface 66 to interlock within a recess 72 in the respective member 62 in a manner and for purposes similar to those described above with regard to the FIG. 5 and 6 embodiments.

An intermediate portion of rigid bearing member 64 bridges the space between resilient members 62 and includes an undersurface portion 74 which is engageable with a rocker element 76 upon sufficient vertical compressive deformation of members 62 under vertical load to provide additional bearing support for the car body and a rigid stop which limits the compressive deformation of members 62.

In FIG. 8 embodiment a rigid bearing element 78 is similar in many respects to the element 64 of FIG. 7, but includes in addition a bearing portion 80 which projects downwardly intermediate the elastomeric members 82 to engage the base portion of a carrier 84 upon sufficient vertical compressive deformation of the elastomeric members 82. The bearing portion 80 thus is provided in lieu of the rocker element 76 from the FIG. 7 embodiment.

With regard to the inventive concept described above, the FIG. 7 and 8 embodiments provide substantially the same features and advantages as do the other described embodiments. It is therefore believed unnecessary to repeat these features and advantages in detail here. The FIG. 7 and 8 embodiments were conceived by one other than the inventor herein after learning of the claimed invention from the inventor herein. These embodiments are disclosed for compliance with best mode disclosure requirements.

Figure 9:
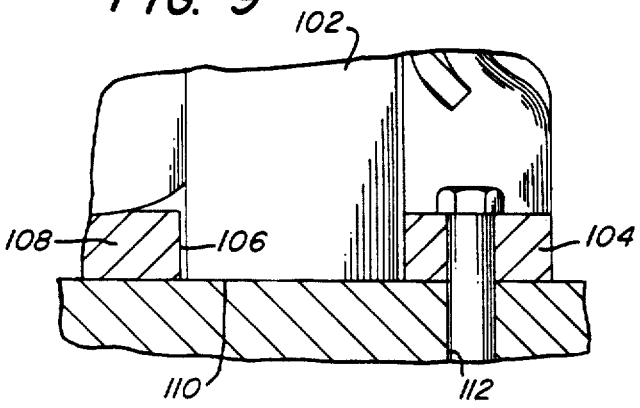
FIG. 9 illustrates a further aspect of the invention that is applicable to any embodiment thereof.
Figure 10:
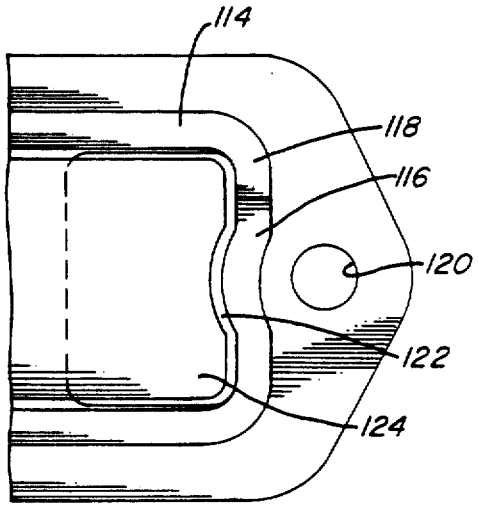
FIG. 10 illustrates a further aspect of the invention that is applicable to any embodiment thereof.
Figure 11:
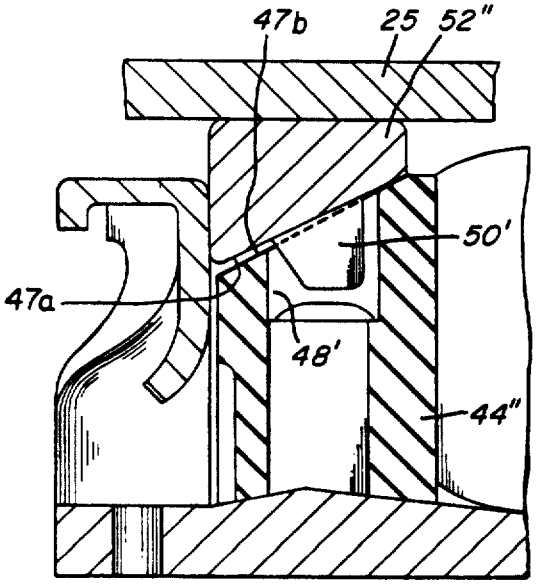
FIG. 11 illustrates a further aspect of the invention which is applicable to any embodiment thereof.

FIGS. 9, 10 and 11 illustrate further aspects of the invention which generally are applicable in any of the above-described embodiments as well as in other modified or alternative embodiments which might occur to those skilled in the art. In FIG. 9 there is shown a fragmentary portion of a side bearing having an elastomeric bearing block 102 which is positioned in a carrier 104 for retention therein to function substantially as above-described with regard to the FIG. 1 to 8 embodiments. Bearing block 102 is vertically elongated so as to extend downwardly through an opening or aperture 106 formed in based portion 108 of carrier 104 such that the lower end 110 of bearing block 102 is supported directly upon the bolster 112 to which the side bearing is affixed by suitable fasteners 114. The vertically elongated bearing block 102 extending through aperture 106 provides for an increased elastomer column height which results in more uniform compressive deformation and more uniform distribution of compressive stresses.

In FIG. 10 there is shown a fragmentary top plan view of a side bearing wherein a lateral clearance such as described with regard to FIG. 4 is provided not only to accommodate lateral expansion of the elastomer under compressive loads but in addition to provide clearance such that lateral loading upon the elastomer will not be supported by the longitudinal sides of the bearing carrier. Specifically, the side bearing carrier 114 is provided with a convex retention portion 116 at each end 118 thereof adjacent to the opening 120 which receives a fastener for securing the side bearing 114 to the bolster. A complementary concavity 122 formed in the elastomeric member 124 mates with retention portion 114 to provide lateral support and retention of elastomeric member 124 under lateral loading. This support structure may be provided in any embodiment of the invention to provide lateral support for the elastomeric members at a point near the point of retention of the side bearing carrier with respect to the bolster where by lateral loads are not imposed upon longitudinal side portions of the bearing carrier, which are typically intended only to position and retain the bearing elements, but not to provide a significant load bearing function.

In FIG. 11 there is shown a portion of a side bearing similar to that shown in FIG. 6 but incorporating in addition an intentionally mismatched angle between the mating surfaces of the cap 52' and the elastomeric member 44''. Specifically, when cap 52'' is engaged with wear plate 25 and at rest, the sloping lower surface 47a of cap 52'' extends at a shallower angle with respect to horizontal than the mating surface 47b of elastomeric member 44''. The magnitude of difference between the slope angles of the mating surfaces is exaggerated in FIG. 11 for clear illustration. With this structural refinement, only the upper end portions of the two mating surfaces are engaged under free standing, no load rest condition. It will be appreciated that in the hereinabove described other embodiments incorporating parallel sloping interfaces between the rigid cap and the elastomeric body in the unloaded or unstrained condition, vertical compressive loading will tend to produce non-uniform vertical compression and non-uniform vertical compressive stresses because the vertical elastomer column height varies. In order to compensate for this variation in column height in the sloped interface embodiments, it is desirable to provide the mismatched angle of FIG. 11. At the onset of the vertical compressive deformation in an embodiment incorporating the mismatched angle, the taller side of the elastomeric member is compressed initially with the initiation of compressive deformation progressing down the sloping interface to the shorter side of the elastomeric column as loading increases. The result is more uniform vertical compressive deformation, ideally approaching that of a horizontal or non-sloping cap to elastomer interface. The mismatched angle thus helps to maintain the elastomer strain within desired limits of magnitude and uniformity to provide optimal side bearing performance. At the same time, longitudinal abuttment pressures are increased at each end of the side bearing, producing enhanced linear shear restraint in comparison to the shear restraint resulting from parallel sloped surfaces.

According to the description hereinabove, the present invention provides a new and improved railway car side bearing for enhanced control of truck hunting and such other dynamic responses as car body roll, with greater uniformity, consistency and control capability that has been available in prior elastomeric side bearings.

The invention having been described in terms of certain presently preferred embodiments thereof, it will be appreciated that the foregoing description is intended to be exemplary of the invention and not to limit same. Further, it is intended that the invention be construed as broadly as permitted by the scope of the claims appended hereto.

I claim:

1. In a railway vehicle side bearing having a rigid elongated channel member which is adapted to be affixed to the bolster of a railway vehicle truck to extend in a generally horizontal orientation with upwardly projecting side walls and longitudinally spaced end walls of the channel member bearing respective uppermost edges to define an upwardly open elongated cavity that is adapted to retain a bearing assembly therein for engagement with a wear plate carried by a railway car body, said bearing assembly comprising:

elastomeric bearing means adapted to be captively received in an upstanding orientation within such a cavity and including at least a pair of elastomeric elements *adapted to be* located adjacent the respective end walls of the cavity and providing respective upper end portions;

rigid metallic friction means including a bearing surface portion adapted for frictional engagement with such a wear plate;

said friction means and the respective said end portions including interengageable portions which are mutually cooperable to support said friction means with respect to the channel member in a manner that a portion of each of said elastomeric elements, when deformed by essentially vertical compressive loading upon vertical movement of said friction means with respect to the channel member, is positioned with respect to the respective adjacent end wall such that, upon application to said elastomeric elements of loads directed horizontally of such a channel at least one of the respective said elastomeric elements deforms in horizontal shear; and means *adapted to* cooperate with the channel member for limiting vertical movement of said friction means in the direction which produces such essentially vertical compressive loading.

2. The bearing assembly as claimed in claim 1 wherein said at least one of said elastomeric elements, when under such essentially vertical compressive loading and such loads directed horizontally of such a channel, additionally derforms in horizontal compression.

3. The bearing assembly as claimed in claim 2 wherein said interengageable portions include mechanical interlocking elements.

4. The bearing assembly as claimed in claim 3 wherein at least some of said mechanical interlocking elements include a projecting portion of said friction means which extends below the uppermost extent of the respective said end portion when the respective said interengageable portions are engaged.

5. The bearing assembly as claimed in claim 4 wherein each said projecting portion extends into a complementary cavity formed in the respective said end portion.

6. The bearing assembly as claimed in claim 4 wherein said friction means is engageable with *each* said end portion along a sloping engagement surface which extends downwardly from said uppermost extent of said [free] end portion.

7. The bearing assembly as claimed in claim 6 wherein [each] said friction means imparts a longitudinal wedging effect, upon application of such essentially vertical compressive loadings, to provide fit up of the respective said elastomeric [element] *elements* with respect to such end walls.

8. The bearing assembly as claimed in claim 6 wherein said sloping engagement surfaces extend downwardly toward said end walls.

9. The bearing assembly as claimed in claim 6 wherein said sloping engagement surfaces extend upwardly toward said end walls.

10. The bearing assembly as claimed in claim 6 wherein [each] said friction means engages said sloping engagement surface only adjacent [an] upper end [portion] *portions* thereof *respectively* under first such essentially vertical compressive loadings.

11. The bearing assembly as claimed in claim 10 wherein engagement of said friction means with said sloping engagement [surface] *surfaces* progresses down the slope of said engagement [surface] *surfaces, respectively* in response to increasing increments of such essentially vertical compressive loading beyond the magnitude of such first loadings.

12. The bearing assembly as claimed in claim 1 wherein each said elastomeric element includes a lateral restraint portion which is cooperable with such end walls to restrain said elastomeric elements against lateral movement under loads directed transversely of both the longitudinal extent of such a channel member and said essentially vertical compressive loading.

13. The bearing assembly as claimed in claim 1 wherein said means for limiting vertical movement includes a rigid bearing means adapted to be disposed within such a cavity longitudinally intermediate such end walls.

14. A side bearing adapted to be mounted on [an] *a generally horizontal* upwardly facing surface of a railway car truck bolster comprising, when so mounted:

an elongated member having a lowermost base portion and upwardly extending side wall portions and end wall portions which define an upwardly open elongated cavity;

said wall portions having uppermost edges throughout their extent;

upstanding elastomeric elements located within said cavity adjacent said end wall portions, respectively;

each of said elastomeric elements [have] *having* an uppermost end surface *including an extent* which [extends at] *forms* an acute angle with respect to [an axis extending in the direction of the longitudinal extent of said elongated member] *a generally horizontal plane;* metallic means supported by said elastomeric elements, respectively, to extend upwardly therefrom;

said metallic means having lower surface portions which are engageable with said uppermost end surfaces of said elastomeric elements, respectively; and a metallic bearing element located within said cavity between said elastomeric elements with the uppermost extent thereof being located vertically intermediate said uppermost edges and the uppermost extent of said metallic means.

15. A side bearing as set forth in claim 14 wherein said uppermost end surfaces converge upwardly.

16. A side bearing as set forth in claim 14 wherein said uppermost end surfaces diverge upwardly.

*17. In a railway vehicle side bearing having a rigid elongated channel member which is adapted to be affixed to the bolster of a railway vehicle truck to extend in a generally horizontal orientation and having upwardly projecting side walls and longitudinally spaced end walls with respective uppermost edges and an upwardly open elongated cavity with the channel member being adapted to retain a bearing assembly therein for engagement with a wear plate carried by a railway car body, said bearing assembly comprising:*

*elastomeric bearing means adapted to be captively received in an upstanding orientation within such a cavity and including at least a pair of elastomeric elements adapted to be located adjacent the respective ends of the cavity and providing respective upper end portions;*

*rigid friction means including a bearing surface portion adapted for frictional engagement with such a wear plate;*

*said friction means and the respective said end portions including interengageable portions which are mutually cooperable to support said friction means with respect to the channel member in a manner that a portion of each of said elastomeric elements, when deformed by essentially vertical compressive loading upon vertical movement of said friction means with respect to the channel member, is positioned with respect to the respective adjacent end of the cavity such that, upon application to said elastomeric elements of loads directed horizontally of such a channel, at least one of the respective said elastomeric elements deforms in horizontal shear; and*

*means adapted to cooperate with such a channel member for limiting vertical movement of said friction*

*means in the direction which produces such essentially vertical compressive loading.*

*18. The bearing assembly as set forth in claim 17 wherein said friction means is engageable with each said upper end portion along a sloping engagement surface which extends downwardly from said uppermost extent of said end portion.*

*19. The bearing assembly as set forth in claim 18 wherein said friction means imparts a longitudinal wedging effect, upon application of such essentially vertical compressive loadings, to provide fit-up of the respective said elastomeric elements with respect to such cavity ends.*

*20. The bearing assembly as set forth in claim 18 wherein said sloping engagement surfaces extend upwardly toward said cavity ends.*

*21. The bearing assembly as set forth in claim 18 wherein said friction means engages said sloping engagement surfaces only adjacent upper end portions thereof, respectively, under first such essentially vertical compressive loadings.*

*22. The bearing assembly as set forth in claim 21 wherein engagement of said friction means with said sloping engagement surfaces progresses down the slope of said engagement surfaces, respectively, in response to increasing increments of such essentially vertical compressive loading beyond the magnitude of such first loadings.*

*23. The bearings assembly as set forth in claim 17 wherein each said elastomeric element includes a lateral restraint portion which is cooperable with such cavity ends to restrain said elastomeric elements against lateral movement under loads directed transversely of both the longitudinal extent of such a channel member and said essentially vertical compressive loading.*

* * * * *